UNITED STATES PATENT OFFICE.

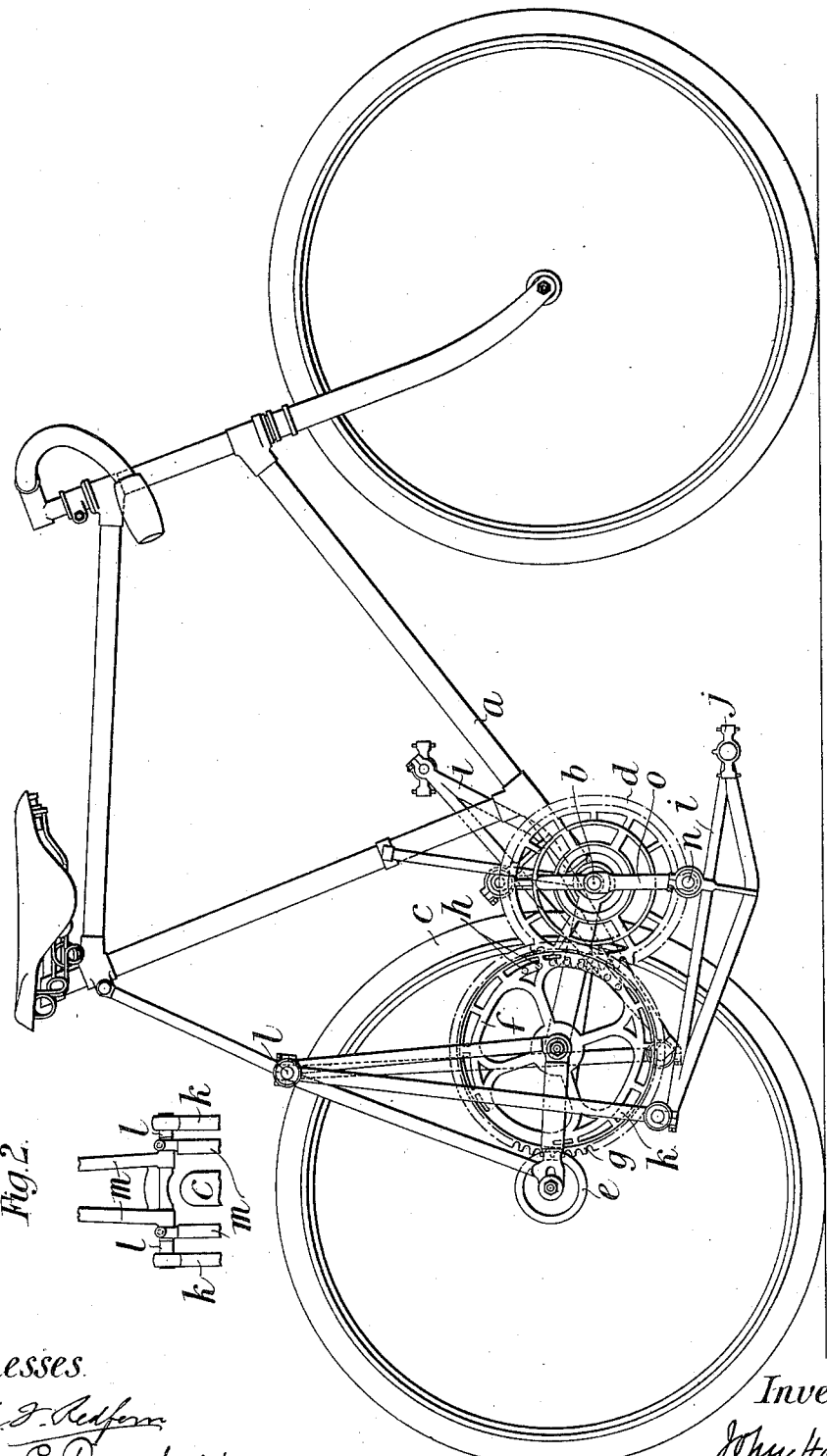

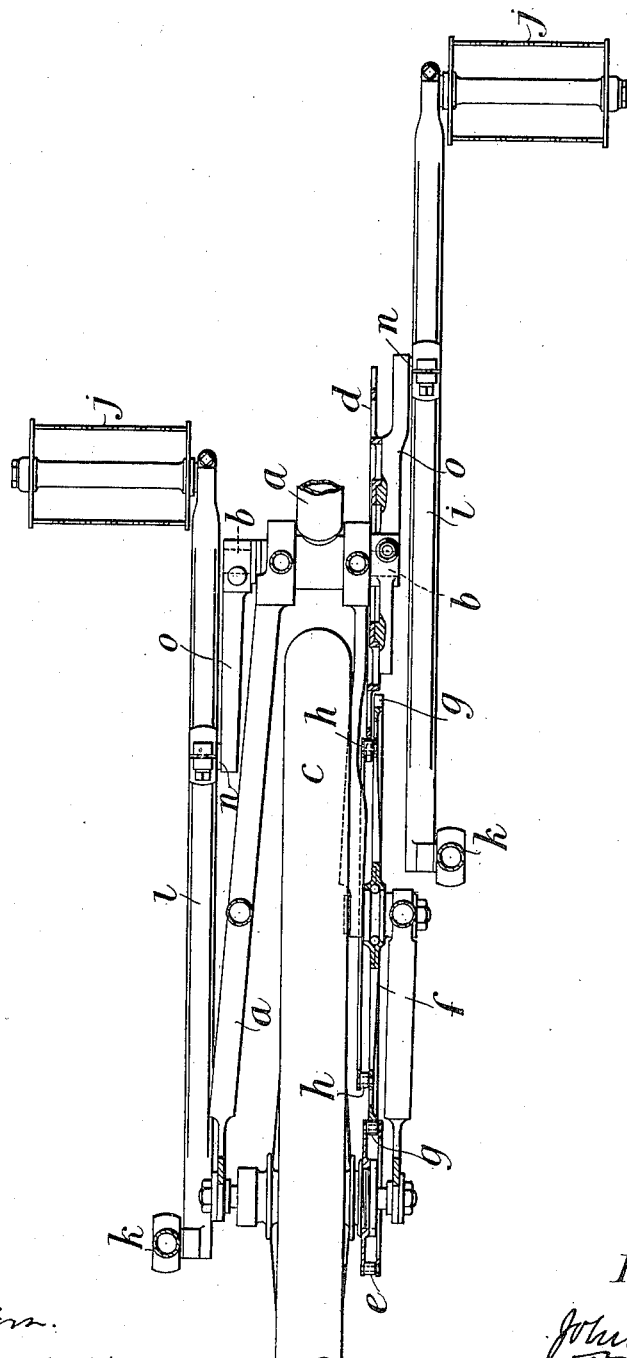

JOHN HARRISON, OF PETERBOROUGH, ENGLAND, ASSIGNOR TO THE ELLIPTIC CYCLE COMPANY, LIMITED, OF SAME PLACE.

DRIVING-GEAR FOR BICYCLES.

SPECIFICATION forming part of Letters Patent No. 652,612, dated June 26, 1900.

Application filed December 24, 1898. Serial No. 700,204. (No model.)

*To all whom it may concern:*

Be it known that I, JOHN HARRISON, a subject of the Queen of Great Britain, residing at Peterborough, England, have invented new and useful Improvements in and Relating to the Driving-Gear of Bicycles, (for which I have applied for a patent in Great Britain, No. 12,083, dated May 27, 1898,) of which the following is a specification.

This invention relates to bicycles of the kind described in the specification of former Letters Patent No. 578,013.

In machines of the kind described in the former specification the pedal-bars were connected to cranks on a shaft which passed through the hub of the driving-wheel. This arrangement renders it necessary that the rider should sit well back over the said driving-wheel. The object of this invention is to place more weight upon the steering-wheel than heretofore, which is advantageous, especially for track-riding; and to this end it consists in connecting the pedal-bars to cranks on a shaft carried in front of the driving-wheel and in transmitting the motion of this shaft to the driving-wheel through the medium of a train of wheels. With the present construction the pendulous rods or links to which the rear ends of the pedal-bars are pivoted are suspended from the seat-stays instead of from a rearward extension of the framing.

To enable my invention to be fully understood, I will describe the same by reference to the accompanying drawings, in which—

Figure 1 is a side elevation of a bicycle having my improved driving-gear applied to it. Fig. 2 is a rear elevation of a portion of the same; and Fig. 3 is a sectional plan of the driving-gear, drawn to a larger scale than Fig. 1.

$a$ is the frame of the machine, and $b$ is the crank-axle, which is pivoted in the said frame in front of the rear or driving wheel $c$ of the machine and has affixed to it an elliptical gear-wheel $d$. The gear $d$ is so placed upon the crank-axle that the cranks $o$ $o$ extend in the direction of the major diameter of the wheel.

By the term "elliptical gear-wheel" used in this specification and in the claims is meant a wheel of the form commonly termed in mechanics an "elliptical gear-wheel," although I am aware that the shape of such a wheel is not a true ellipse.

$e$ is the pinion upon the axle of the wheel $c$, and $f$ is an intermediate gear-wheel having two sets of teeth—viz., the teeth $g$, which engage with the pinion $e$, and the teeth $h$, with which the wheel $d$ engages, the said teeth $h$ being arranged in the form of an elliptical gear-wheel, so as to remain in gear with the elliptical wheel $d$. As shown, the pinion $e$ is represented as provided with roller-teeth, and the teeth $h$ are also formed as roller-teeth. It is to be understood that ordinary teeth may be used, if desired.

$i$ $i$ are the pedal-bars, each of which at its front end carries a treadle $j$ and at its rear end is connected to the lower end of a pendulous link $k$, which at its upper end is pivoted upon a pin $l$, carried by the back or seat stays $m$ of the machine, as shown in Figs. 1 and 2. The said pedal-bars are also connected to the crank-pins $n$, carried by the cranks $o$ on the crank-axle $b$. With this arrangement it will be understood that the weight of the rider is brought much nearer to the front of the machine than is the case when the crank-axle $b$ is passed through the center of the driving-wheel, as described in the specification before referred to.

An advantage of this invention is that, if desired, the pedal-bars may be dispensed with and ordinary treadles placed upon the crank-pins, so that the cranks are directly driven.

Having now particularly described and ascertained the nature of my said invention and in what manner the same is to be performed, I declare that what I claim is—

In a bicycle, the combination with the frame and a driving-wheel mounted therein, of the crank-shaft, an elliptical gear-wheel mounted thereon, cranks mounted on said crank-shaft in line with the major diameter of said gear-wheel, a circular gear-wheel on the driving-wheel axle, an intermediate wheel provided with a circular series of teeth meshing with the gear-wheel on the driving-wheel axle, and a series of gear-teeth adapted to mesh with the said elliptical wheel, horizontally-disposed pedal-bars, each connected intermediate its ends to one of said cranks and a pedal on each of said bars forward of its connection with the crank, and a link pivotally connected to the rear end of each of said pedal-bars, said links having their upper ends pivoted to the frame forward of the axle of the driving-wheel, substantially as described.

JOHN HARRISON.

Witnesses:
G. T. REDFERN,
JOHN E. BOUSFIELD.